June 11, 1968    D. G. HEDGSPETH ET AL    3,387,376
TEMPLATE FOR USE IN MOUNTING MOLDING ON PANELS
Filed April 28, 1967      2 Sheets-Sheet 1
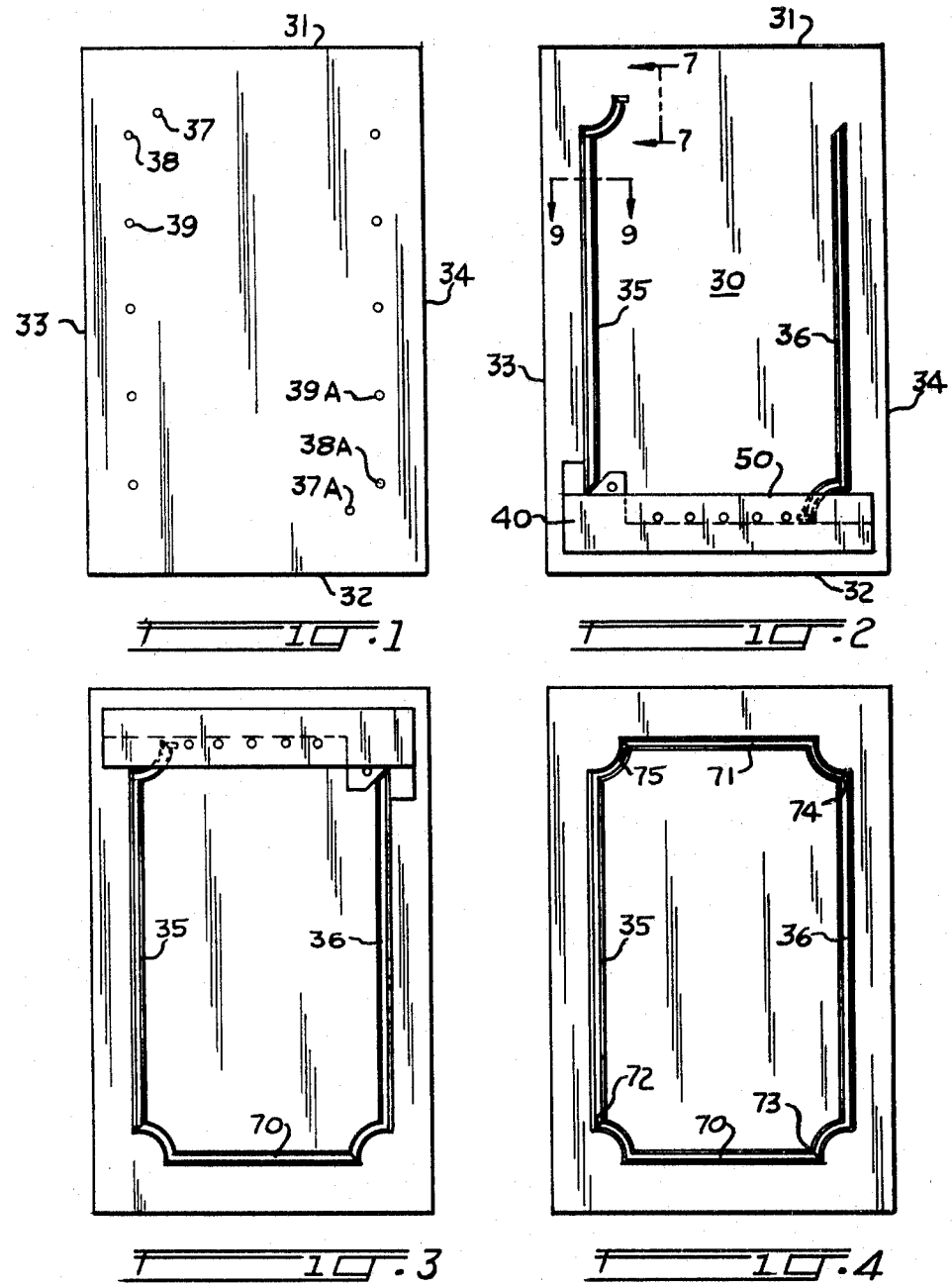
INVENTOR
DUIE GARLAND HEDGSPETH
LOUIS E. HIMELREICH
BY *W. E. Sherwood*
ATTORNEY

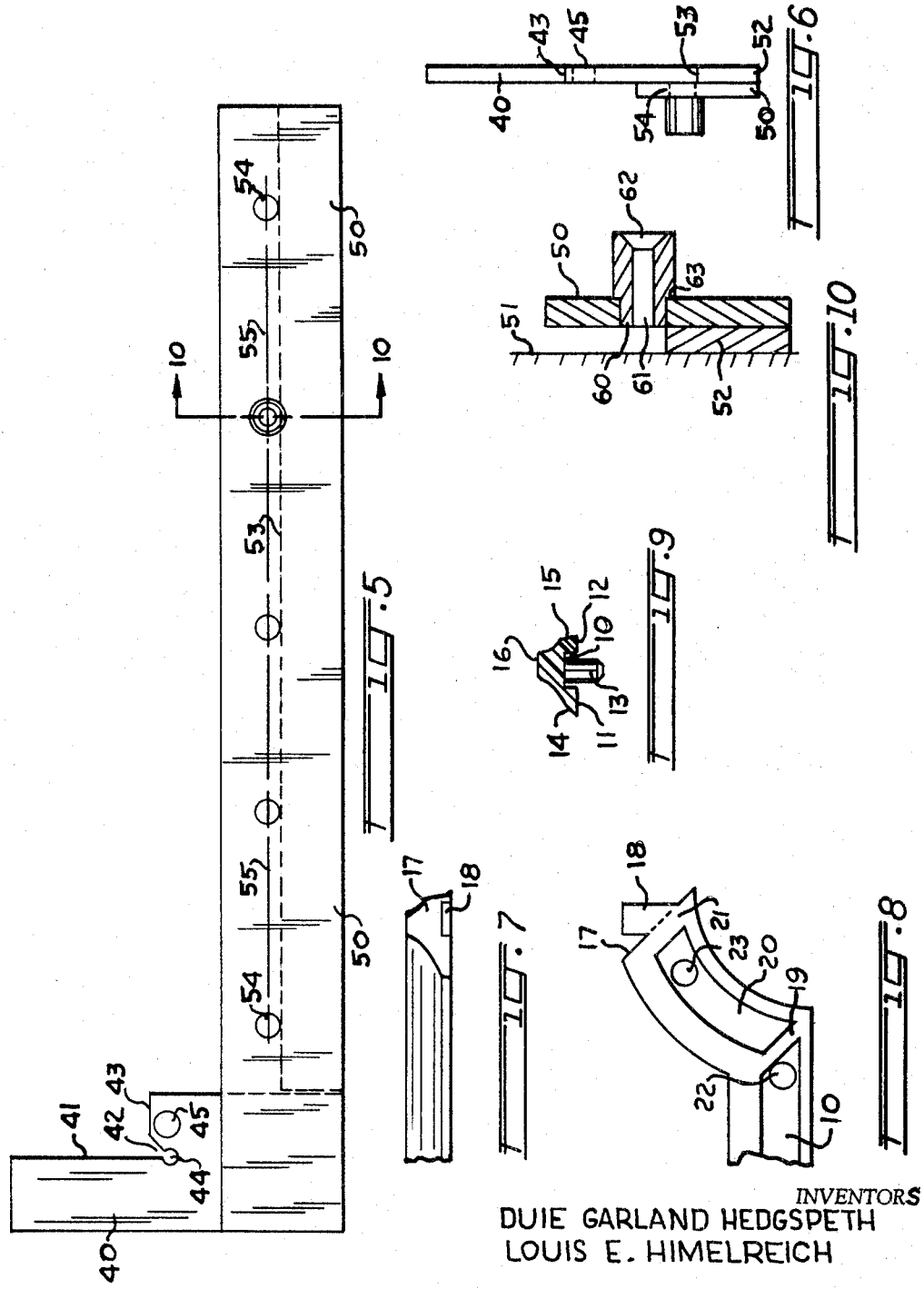

United States Patent Office 3,387,376
Patented June 11, 1968

3,387,376
TEMPLATE FOR USE IN MOUNTING MOLDING ON PANELS
Duei Garland Hedgspeth and Louis E. Himelreich, Louisville, Ky., assignors to H. J. Scheirich Company, Louisville, Ky., a corporation of Kentucky
Original application Dec. 14, 1965, Ser. No. 513,708. Divided and this application Aug. 28, 1967, Ser. No. 663,829
3 Claims. (Cl. 33—174)

ABSTRACT OF THE DISCLOSURE

A template for locating the positions at which holes are to be formed in a panel having an emplaced molding strip thereon. The template is adapted to engage with the emplaced strip in order to establish the proper location of the holes into which pegs on a complementary molding strip may be subsequently fitted.

CROSS-REFERENCES TO RELATED APPLICATIONS

This application is a division of our copending application Ser. No. 513,708, filed Dec. 14, 1965.

BACKGROUND OF THE INVENTION

(1) Field of the invention

The invention relates to the ornamentation of panels, such as wooden doors for cabinets having a molding mounted thereon, and to a template for locating the position for such molding.

(2) Description of the prior art

In the channels of trade it frequently is desirable for the manufacturer to ship unornamented panels and the necessary materials for ornamenting the same, together as a kit, to the distributor of its products. This places the work of applying ornamentation to the panel in the hands of an artisan who, despite the explicit instructions accompanying the kit, may find it to be a tedious and difficult task to apply the ornamentation in the manner contemplated by the manufacturer. When the ornamentation consists of simple shapes of molding strips which can be nailed or glued to the panel surface, a careful artisan would have no difficulty. However, when more elaborate molding designs which are to be held in place mechanically, by pegs on the molding fitting into holes in the panel, are involved, a more difficult situation is presented and which it is a purpose of our invention to overcome.

For example, in this type of molding as illustrated in U.S. patent application Ser. No. 482,694 and which preferably is of plastic material will engage with a tight fit diameter with respect to the hole to the end that the compressed peg material will engage with a tight fit against the exposed fibers of wood of the panel about the wall of that hole. The molding strips are flexible and minor variations in the relative location of the pegs on the molding strips and even minor variations in the outside dimensions of the panel edges exert their influence upon whether the molding will fit properly when engaged with the panel, and as will be evident the locating of the holes in the panel is of major importance.

It has been found that when the complete pattern of holes is formed in the panel, at the factory, and the plastic molding strips are later fixed to the panel elsewhere, far more difficulty is experienced in attaining a proper fit of the strips than if a portion of the holes are formed in the panel after a portion of the strips have already been affixed to that panel. This desired procedure requires the use of a suitable template for the artisan and the present invention relates to such a template.

SUMMARY

The invention is embodied in a template having a relatively long leg portion extending generally normal to a laterally disposed relatively short leg portion and with a series of spaced drill holes in the long leg portion. The short leg portion is provided with a straight edge adapted to abut against the outside edge of a first emplaced molding strip having an end portion cut on a bias and such short leg portion includes a notch adapted to receive the biased end portion of the emplaced first strip. The long leg portion is provided with a narrow base adapted to rest upon the panel to which the emplaced strips are attached and with a wide upper portion adapted to extend above a second emplaced molding strip which is disposed generally parallel to the first strip and at the opposite side of the panel.

BRIEF DESCRIPTION OF THE DRAWINGS

The objects of the invention will be more apparent when considered in conjunction with the following description and with respect to the accompanying drawings in which:

FIG. 1 is a plan view of the panel at the conclusion of the formation of holes for emplacing the initial molding strips.

FIG. 2 is a plan view of the panel in readiness for locating of the third array of holes in the panel.

FIG. 3 is a plan view of the panel following the mounting of the third molding strip and in readiness for locating the fourth array of holes.

FIG. 4 is a plan view of the finished panel.

FIG. 5 is a plan view of the hole-forming template.

FIG. 6 is an end view of the template.

FIG. 7 is an end view of the first end of the first strip as seen from line 7—7 of FIG. 2.

FIG. 8 is a view of the bottom side of the first end of the first strip.

FIG. 9 is a sectional view taken through the first strip on line 9—9 of FIG. 2, and FIG. 10 is a sectional view taken in line 10—10 of FIG. 5 and with a bushing in place.

DESCRIPTION OF THE PREFERRED EMBODIMENT

Referring first to FIGS. 7 to 9 the invention is disclosed, by way of illustration and not of limitation, in connection with the use of a flexible plastic molding strip which has an arcuate ornamental portion at one end and a straight portion at its other end. Such a strip may be extruded, molded, or otherwise formed and in a typical cross-section, as seen in FIG. 9, has a groove 10 on its underside and with generally flat faces 11 and 12 alongside the groove and which faces are to be forced into close contact with the outer face of the panel. Projecting downwardly from the body portion of the strip is an array of integral plastic pegs, one of which is shown at 13, and which are to fit into holes in the panel as later to be described. Inwardly inclined side edges 14 and 15 joined to the upper flat top 16 by curved surfaces serve to give an attracticve three-dimensioned configuration to the strip.

At the arcuate end of the strip the same outer surface configuration is employed and extends to an end 17 which is vertically cut on a bias, for example 45°. Projecting from this end adjacent the lower edge thereof is a short tab 18 having a location and dimensions suitable for interlocking engagement in the groove 10 of the strip with which it is to cooperate in forming the close fitting corner of the assembled molding. At the underside junction of the straight and arcuate portions of the strip a reinforcing web 19 separating the straight groove 10 from the curved groove 20 is provided and an end web 21 is likewise provided at the outer end of groove 20. Moreover, a peg 22 is located in groove 10 adjacent web 19 and a peg 23 is located in groove 20 adjacent web 21. These two pegs are relatively close together, as contrasted with the spacing of the other pegs in groove 10, and thus anchor the arcuate portion of the strip somewhat more rigidly than do the pegs in the straight portion thereof.

In carrying out the invention involving the mounting of molding strips as thus described upon the flat panel 30 of FIG. 2 and, which for example, may be the generally rectangular door of a cabinet and having upper and lower edges 31, 32 and side edges 33, 34, the initial step comprises the formation of holes which are to receive the pegs of strips 35 and 36. As will be understood, the strips 35 and 36 are of a standard size chosen for use with a panel whose dimensions likewise are of standard size. Accordingly, panel 30 is first inserted in a conventional drilling jig or gauge (not shown) having locator pins which touch the upper edge 31 and side edge 33, and the first array of holes including holes 37, 38 of the pegs 23 and 22 of strip 35 and one or more holes 39 for one or more corresponding pegs 13 of the strip are bored in the panel. The panel then is turned so as to bring its lower edge 32 and its other side edge 34 into register with the jig and the second array of holes is bored including holes 37A and 38A for the pegs 23 and 22 of strip 36 and one or more holes 39A for one or more corresponding pegs 13 of that strip.

Thereafter, the bored panel is removed from the jig and the strips 35 and 36 are affixed by placing the appropriate pegs over the appropriate holes and by tapping the pegs in place by light taps of a hammer beginning with the farthermost peg on the curved portions of the strips.

Referring now to FIGS. 5, 6 and 10, at template comprises a relatively short, generally L-shaped flat leg portion 40 having a straight edge 41 on one of its inner faces. A notch 42 is formed in the other of its inner faces 43 and forms an acute angle with the straight edge 41, which angle corresponds to the angle on which the biased ends of the molding strips are cut. At the apex of the notch a recess 44 of sufficient size to accommodate any flash or burrs on the extreme end of the strip is provided. Adjacent the notch and offset from the straight edge 41 an oversize hole 45 is provided and into which a removable drill bushing, as later to be described, is adapted to be fitted.

Attached to the thus described short leg portion is a relatively long leg portion 50 which is elevated with respect to the plane 51 of the panel as best shown in FIG. 10. This long leg portion has a length sufficient to reach beyond the second strip 36 as seen in FIG. 2 and is sufficiently high to extend over the top surface of that second strip. A suitable means which may comprise a flat bar 52 supports the long leg portion at the appropriate height and as a feature of the invention has a straight edge 53 which extends normally to the direction of the straight edge 41.

Formed in the long leg portion is a series of oversize drill holes 54 preferably of the same size as hole 45. The axes of holes 54 lie on a straight line 55 parallel to the straight edge 53 and displaced outboard of the same at the same distance separating the lower edge of wall 14 and the axis of peg 13 found in the standard molding strip shown in FIG. 9.

For reception in the drill holes of the template a series of hardened, metallic drill bushings, one of which is shown in FIG. 10, will be employe. Such a bushing includes a hollow stem portion 60 having an aperture 61 therethrough with a diameter equal to that of the hole to be formed in the panel and with a length sufficient to insure that the axis of the drill bit when operating will be normal to the plane of the panel. The upper end of the bushing aperture is flared as at 62 to assist in insertion of the drill bit and an offset shoulder 63 is formed on the bushing to register the same in the hole in the template. A similar bushing, of course, is used with the hole 45.

With the foregoing description of the template in mind, reference is now made to FIGS. 2 and 3. With molding strips 35 and 36 affixed to the panel it will be understood that the lower biased end of the non-rigid plastic strip 35 is free to deflect laterally to a slight amount, for example, about 0.125 inch, and particularly since the lowermost peg on that strip will generally be found at a sufficient distance from that biased lower end to permit lateral flexing of the end of the strip. Accordingly, the artisan then places the template in position with its straight edge 41 abutting against the outside edge of strip 35 and with its notch 42 embracing the biased lower or second end of strip 35 with a snug fit and then swings the distal edge of the long leg portion of the template until straight edge 53 of the supporting means contacts the extreme outer edge of the biased first, or arcuate, end of the affixed strip 36. By means of a conventional drill he then bores the third array of holes in the panel extending from the lower, or second, end of strip 35 in the general direction of the first end of strip 36, and after accomplishing this then adjusts the template to the other end of those strips and drills the fourth array of holes in a corresponding manner. Alternately, the drilling of the fourth array of holes may be done after the third strip 70 is affixed to the panel.

Having drilled the third array of holes and having removed the template, a third strip is temporarily emplaced with one of its pegs partially inserted in the appropriate hole of the third array of such holes and with its biased first end at the same distance from the second strip as is the biased second end of strip 35. This third strip 70, as well as the fourth strip 71, are substantially identical, except as to length, with the strips 35, 36. Such length, moreover, is greater than the distance which they are to span between the previously emplaced strips. With the strip 70 in place the artisan then marks thereon the point at which a snug beveled fit will occur with the biased first end of strip 36 and thereafter removes the strip 70 from its temporary emplacement. By means of a conventional mitering apparatus the strip 70 is then cut at the marked point and the cut-off portion of its length is discarded.

Subsequently, the third strip 70 is manipulated to bring its tab 18 into position within the groove 10 of strip 35 and is twisted slightly to register its peg 33 with the first hole in the third array of holes. Then by means of light taps of a hammer beginning with the peg 23 the third strip is emplaced, it being understood that at its second end the groove 10 thereof will encompass the tab 18 of the strip 36. In like manner the fourth strip 71 is cut and emplaced thus to form the generally rectangular ornamental pattern of molding as shown in FIG. 4.

As will now be noted, the cooperating biased ends of the four strips are closely adjacent and preferably in snug contact with each other along the junction lines 72, 73, 74 and 75. It is a feature of the invention that these junction lines are uniform, that no cracks of noticeable size exist between the biased ends of the adjacent strips, and that the only individual treatment required of the strips, at the point of installation constitutes the marking and cutting at one end of the two strips 70 and 71. As will further be noted, the deflection of the second end of strips 35 and 36 caused by the template as it registers the proper locations of the third and fourth array of holes is not noticeable to the eye and does not detract from the ornamental appearance. In contrast, the presence of a crack between the abutting ends of the strips would be at once noticeable and unsightly.

Having thus described the invention, it will be apparent that modifications of the apparatus may be resorted to without departing from the concept of the invention, as described, and it is intended by the appended claims to cover such modifications as fall within the true spirit and scope of the invention.

What is claimed is:

1. A template for use in locating drilled holes in a flat panel intermediate a pair of spaced molding strips affixed to said panel and having their ends cut on a bias comprising, a relatively short generally L-shaped flat leg portion having a straight edge on one of its inner faces adapted to abut against the outside edge of a first molding strip and a notch in the other of its inner faces forming an acute angle with said one inner face and adapted to abut against the biased end of said first strip, said short leg portion having an under surface adapted to be flush with the surface of said panel, a relatively long leg portion attached to said short leg portion and disposed at an elevated position with respect to the underside of said short leg portion, and a supporting means for said long leg portion disposed on the underside thereof and adapted to rest upon the surface of said panel, said supporting means having a straight edge extending normally to the direction of the straight edge of said short leg portion, said short leg portion having a drill hole therethrough adjacent the notch therein and said long leg portions having a series of spaced drill holes therethrough located along a line parallel to the straight edge of said supporting means and outboard thereof, said long leg portion having a length sufficient to reach beyond the biased end of the second molding strip thereby to enable the straight edge of said means to touch the extreme edge of the second strip and the elevated long leg portion to extend over the second strip.

2. A template as defined in claim 1 including a drill bushing positioned in the drill hole in said template during drilling usage of the same, said bushing having an aperture therein with a length greater than the length of the drill hole in which it is positioned.

3. A template as defined in claim 1 including a recess in the short leg portion at the apex of said acute angle, said recess being of sufficient size to accommodate burrs of molding strip material attached to the strip of the extreme pointed edge of the biased end thereof.

References Cited

UNITED STATES PATENTS 1,599,025  9/1926  Magnuson _____ 33—194
2,548,197  4/1951  Conner _____ 33—174

SAMUEL S. MATTHEWS, *Primary Examiner.*